US012041538B2

United States Patent
Olvera-Hernandez et al.

(10) Patent No.: US 12,041,538 B2
(45) Date of Patent: Jul. 16, 2024

(54) METHODS, APPARATUSES AND SYSTEMS DIRECTED TO HANDLING OF MUTUALLY EXCLUSIVE NETWORK SLICES

(71) Applicant: InterDigital Patent Holdings, Inc., Wilmington, DE (US)

(72) Inventors: Ulises Olvera-Hernandez, Montreal (CA); Guanzhou Wang, Brossard (CA); Saad Ahmad, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 129 days.

(21) Appl. No.: 17/252,166

(22) PCT Filed: Jun. 14, 2019

(86) PCT No.: PCT/US2019/037336
§ 371 (c)(1),
(2) Date: Dec. 14, 2020

(87) PCT Pub. No.: WO2019/245921
PCT Pub. Date: Dec. 26, 2019

(65) Prior Publication Data
US 2021/0250854 A1    Aug. 12, 2021

Related U.S. Application Data

(60) Provisional application No. 62/688,811, filed on Jun. 22, 2018.

(51) Int. Cl.
*H04W 48/18* (2009.01)
*H04W 24/02* (2009.01)
(Continued)

(52) U.S. Cl.
CPC ........... *H04W 48/18* (2013.01); *H04W 24/02* (2013.01); *H04W 28/16* (2013.01); *H04W 40/248* (2013.01); *H04W 48/16* (2013.01)

(58) Field of Classification Search
CPC ..... H04W 48/18; H04W 24/02; H04W 28/16; H04W 40/248; H04W 48/16
See application file for complete search history.

(56) References Cited

U.S. PATENT DOCUMENTS

2017/0064699 A1    3/2017  Rajagopal et al.
2018/0324577 A1*  11/2018  Faccin ................. H04W 76/27
(Continued)

FOREIGN PATENT DOCUMENTS

EP    3439277 A1    2/2019
EP    3544337 A1    9/2019
(Continued)

OTHER PUBLICATIONS

Interdigital, Inc., "Solution to KI1: Mutually exclusive access to Network Slices", 3GPP Tdoc S2-187289, 3GPP SA WG2 Meeting #128, Vilnius, LT, Jul. 2-6, 2018, 6 pages.
(Continued)

*Primary Examiner* — Michael K Phillips
(74) *Attorney, Agent, or Firm* — Julian F. Santos

(57) ABSTRACT

Methodologies, technologies, etc., directed to handling of mutually exclusive network slices are provided herein. Pursuant to the methodologies and technologies a device or network may select a set of network slices that may serve the device simultaneously. The methodologies and technologies may involve using allowed Network Slice Selection Assistance Information (NSSAI), prior to applying exclusion rules and network slice exclusion rules, to enable selection of mutually exclusive network slices to be used by the device after registration. The methodologies and technologies may involve a device applying network slice exclusion rules for entries in the allowed NSSAI based on location and time when establishing a PDU session on a particular single NSSAI and/or involve requesting release of PDU session(s) served by currently accessed network slices when requesting
(Continued)

establishment of new PDU session(s) on a network slice that cannot be accessed simultaneously as those currently accessed network slices.

24 Claims, 9 Drawing Sheets

(51) Int. Cl.
*H04W 28/16* (2009.01)
*H04W 40/24* (2009.01)
*H04W 48/16* (2009.01)

(56) References Cited

U.S. PATENT DOCUMENTS

| | | | |
|---|---|---|---|
| 2019/0029065 A1* | 1/2019 | Park | H04W 48/02 |
| 2019/0075512 A1* | 3/2019 | Jin | H04W 24/02 |
| 2019/0141606 A1* | 5/2019 | Qiao | H04W 48/04 |
| 2019/0182875 A1* | 6/2019 | Talebi Fard | H04W 8/18 |
| 2019/0223088 A1* | 7/2019 | Pateromichelakis | H04L 41/0893 |
| 2019/0357129 A1* | 11/2019 | Park | H04W 60/04 |
| 2020/0059989 A1* | 2/2020 | Velev | H04W 76/30 |
| 2020/0137552 A1* | 4/2020 | Park | H04W 60/06 |
| 2020/0187061 A1* | 6/2020 | Zhu | H04L 67/14 |
| 2020/0252862 A1* | 8/2020 | Kim | H04W 60/00 |
| 2021/0112513 A1* | 4/2021 | Chun | H04W 48/18 |
| 2021/0168901 A1* | 6/2021 | Kim | H04W 48/16 |
| 2021/0227596 A1* | 7/2021 | Aramoto | H04W 76/18 |
| 2022/0053603 A1* | 2/2022 | Talebi Fard | H04W 60/00 |

FOREIGN PATENT DOCUMENTS

| | | |
|---|---|---|
| KR | 20190082897 A | 7/2019 |
| WO | 2017170690 A1 | 10/2017 |
| WO | 2018093168 A1 | 5/2018 |

OTHER PUBLICATIONS

Qualcomm Incorporated et al., "TS 23.501: network selection of slices requested by UE for prioritization and co-existence", 3GPP Tdoc S2-174443, 3GPP SA WG2 Meeting #S2-122, San Jose Del Cabo, Mexico, Jun. 26-30, 2017, 8 pages.

LG Electronics, "TS 23.502: DN authorization and PDU session anchor relocation", 3GPP Tdoc S2-174591, 3GPP SA WG2 Meeting #122, San Jose Del Cabo, Mexico, May 26-30, 2017, 11 pages.

Qualcomm Inc., "TS 23.501: Slice co-existence and conflicting S-NSSAIs", 3GPP Tdoc S2-173103, 3GPP SA WG2 Meeting #121, Hangzhou, P. R. China, May 15-19, 2017, 8 pages.

Nokia et al., "Coexistence among network slices", 3GPP Tdoc S2-172230, SA WG2 Meeting #120, Mar. 27-31, 2017, Busan, Korea, 3 pages.

3rd Generation Partnership Project; Technical Specification Group Services and System Aspects; Procedures for the 5G System; Stage 2 (Release 15), 3GPP TS 23.502 V15.1.0 (Mar. 2018), 285 pages.

3rd Generation Partnership Project; Technical Specification Group Services and System Aspects; System Architecture for the 5G System; Stage 2 (Release 15), 3GPP TS 23.501 V15.1.0, Mar. 2018, 201 pages.

Huawei, et al., "Solutions for MEANS (Mutually Exclusive Access to Network Slices)", 3GPP Tdoc S2-185389, 3GPP TSG-SA WG2 Meeting #127bis, Newport Beach, USA, May 28-Jun. 1, 2018, 5 pages.

* cited by examiner

| Network Slice | Exclusion (According to e.g., PLMN 1) | Priority |
|---|---|---|
| S-NSSAI-1 | S-NSSAI-3 | 1 |
|  | S-NSSAI-4 |  |
| S-NSSAI-2 | S-NSSAI-3 | 4 |
| S-NSSAI-3 | S-NSSAI-1 | 2 |
|  | S-NSSAI-2 |  |
| S-NSSAI-4 | S-NSSAI-1 | 3 |

| Network Slice Group | Network Slice | Can be used Simultaneously |
|---|---|---|
| 1 | S-NSSAI-1 | S-NSSAI-2 |
| 2 | S-NSSAI-2 | S-NSSAI-1 |
|  |  | S-NSSAI-4 |
| 3 | S-NSSAI-3 | S-NSSAI-4 |
| 4 | S-NSSAI-4 | S-NSSAI-2 |
|  |  | S-NSSAI-3 | ously implemented alone or in various combinations:

METHODS, APPARATUSES AND SYSTEMS DIRECTED TO HANDLING OF MUTUALLY EXCLUSIVE NETWORK SLICES

CROSS-REFERENCE TO RELATED APPLICATIONS

This application is a National Stage of International Application PCT/US19/037336, filed under 35 U.S.C. § 371 on Jun. 14, 2019, which claims the benefit of U.S. Provisional Application No. 62/688,811 filed on Jun. 22, 2018, the contents of which are incorporated by reference herein.

BACKGROUND

Mobile communications continue to evolve. An example of this is the current and ongoing evolution to fifth generation ("5G") mobile communications and the attendant networks, devices, services, etc. A communications network supporting 5G mobile communications may provide differentiated services using respective network slices. For example, the communications network may provide personal phone services via a first network slice, critical services (e.g., public safety) via a second network slice, and Internet of Things (IoT) services (e.g., sensors, machines, etc.) via a third network slice.

SUMMARY

As would be appreciated by a person of skill in the art based on the teachings herein, encompassed within the embodiments described herein, without limitation, are procedures, methods, architectures, apparatuses, systems, devices, and computer program products directed to communications (e.g., simultaneous communication sessions) via mutually exclusive network slices. Among the methods and apparatuses provided herein are methods and apparatuses for establishing a PDU session via a network slice.

Pursuant to the methodologies and technologies provided herein, a wireless transmit/receive unit (WTRU) may be configured with or may obtain Network Slice Selection Assistance Information (NSSAI), for example, including a set of Single NSSAIs (S-NSSAI) in a Public Land Mobile Network (PLMN). The NSSAI may be used prior to applying Network Slice (NS) exclusion rules to enable a selection of mutually exclusive network slices to be used by the WTRU after system registration.

Pursuant to the methodologies and technologies provided herein, a WTRU may apply Network Slice exclusion rules based on location and time when establishing a Protocol Data Unit (PDU) Session on a particular S-NSSAI.

Pursuant to the methodologies and technologies provided herein, a WTRU may request the release of PDU session(s) served by currently accessed Network Slices, when requesting the establishment of new PDU session(s) on a network slice that cannot be accessed simultaneously as those currently accessed network slices.

Among the methods is a method, which may be implemented in a wireless transmit/receive unit (WTRU), for establishing a new packet data unit (PDU) session via a candidate network slice. The method may include any of determining a network slice mutually exclusive with the candidate network slice; determining a priority of the candidate network slice; on condition that a PDU session is established via the mutually exclusive network slice with lower priority than the candidate network slice, requesting a release of the PDU session established on the mutually exclusive lower priority network slice; and establishing the new PDU session via the candidate network slice.

The following features of the method for establishing a new PDU session may be advantageously implemented alone or in various combinations:
  the method may include, on the condition that the priority of the candidate network slice is lower than the priority of the mutually exclusive network slice associated with the established PDU session, cancelling the establishment of the new PDU session;
  the method may include sending a registration request to the network;
  the method may include receiving configuration information; and
  the method may include receiving a plurality of exclusion rules of network slices from the network.

Among the apparatuses is an apparatus that may include circuitry, such as any of a transmitter, receiver, processor and memory, configured to establish a new PDU session via a candidate network slice. The apparatus may carry out any of determining a network slice mutually exclusive with the candidate network slice; determining a priority of the candidate network slice; on condition that a PDU session is established via the mutually exclusive network slice with lower priority than the candidate network slice, requesting a release of the PDU session established on the mutually exclusive lower priority network slice; and establishing the new PDU session via the candidate network slice. In an embodiment, the apparatus may be a wireless transmit/receive unit (WTRU). The following features of the apparatus for establishing a new PDU session may be advantageously implemented alone or in various combinations:
  the apparatus may cancel the establishment of the new PDU session, e.g., on the condition that the priority of the candidate network slice is lower than the priority of the mutually exclusive network slice associated with the established PDU session;
  the apparatus may send a registration request to the network;
  the apparatus may send receiving configuration information; and
  the apparatus may receive a plurality of exclusion rules of network slices from the network.

Among the methods is a method that may include any of receiving from a wireless transmit/receive unit a request for releasing a packet data unit (PDU) session to enable a new PDU session to be established; executing a PDU session release procedure based on the request; and initiating a PDU session establishment procedure for the new PDU session. The following features of the method may be advantageously implemented alone or in various combinations:
  the executing and initiating may happen at the same time;
  the method may include receiving a registration request from the WTRU;
  the method may include sending configuration information to the WTRU; and
  the method may include providing a plurality of exclusion rules to the WTRU.

Among the apparatuses is an apparatus that may include circuitry, such as any of a transmitter, receiver, processor and memory, configured to receive from a wireless transmit/receive unit a request for releasing a packet data unit (PDU) session to enable a new PDU session to be established; execute a PDU session release procedure based on the request; and/or initiate a PDU session establishment procedure for the new PDU session. The following features of the apparatus may be advantageously implemented alone or in various combinations:

the execution and initiation may happen at the same time;
the apparatus may receive a registration request from the WTRU;
the apparatus may send configuration information to the WTRU; and
the apparatus may provide a plurality of exclusion rules to the WTRU.

In an embodiment, the apparatus may be a network element.

Among the computer program products is a computer-readable storage medium comprising instructions which when executed by a computer cause the computer to carry out any of determining a network slice mutually exclusive with the candidate network slice; determining a priority of the candidate network slice; on condition that a PDU session is established via the mutually exclusive network slice with lower priority than the candidate network slice, requesting a release of the PDU session established on the mutually exclusive lower priority network slice; and establishing the new PDU session via the candidate network slice. The following features of the computer-readable storage medium may be advantageously implemented alone or in various combinations:

the instructions of computer-readable storage medium may cause the computer to cancel the establishment of the new PDU session on the condition that the priority of the candidate network slice is lower than the priority of the mutually exclusive network slice associated with the established PDU session;
the instructions of computer-readable storage medium may cause the computer to send a registration request to the network;
the instructions of computer-readable storage medium may cause the computer to receive configuration information; and
the instructions of computer-readable storage medium may cause the computer to receive a plurality of exclusion rules of network slices from the network.

Among the computer program products is a computer-readable storage medium comprising instructions which when executed by a computer cause the computer to carry out any of receiving from a wireless transmit/receive unit a request for releasing a packet data unit (PDU) session to enable a new PDU session to be established; executing a PDU session release procedure based on the request; and initiating a PDU session establishment procedure for the new PDU session. The following features of computer-readable storage medium may be advantageously implemented alone or in various combinations:

the executing and initiating may happen at the same time;
the instructions of computer-readable storage medium may cause the computer to receive a registration request from the WTRU;
the instructions of computer-readable storage medium may cause the computer to send configuration information to the WTRU; and
the instructions of computer-readable storage medium may cause the computer to provide a plurality of exclusion rules to the WTRU.

Although various embodiments are described and/or claimed herein in which an apparatus, system, device, etc. and/or any element thereof carries out an operation, process, algorithm, function, etc. and/or any portion thereof, it is be understood that any embodiments described and/or claimed herein assume that any apparatus, system, device, etc. and/or any element thereof is configured to carry out any operation, process, algorithm, function, etc. and/or any portion thereof.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 10 is a system diagram illustrating an example radio access network (RAN) and an example core network (CN) that may be used within the communications system illustrated in FIG. 1A according to an embodiment;

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein.

Figure 1A:
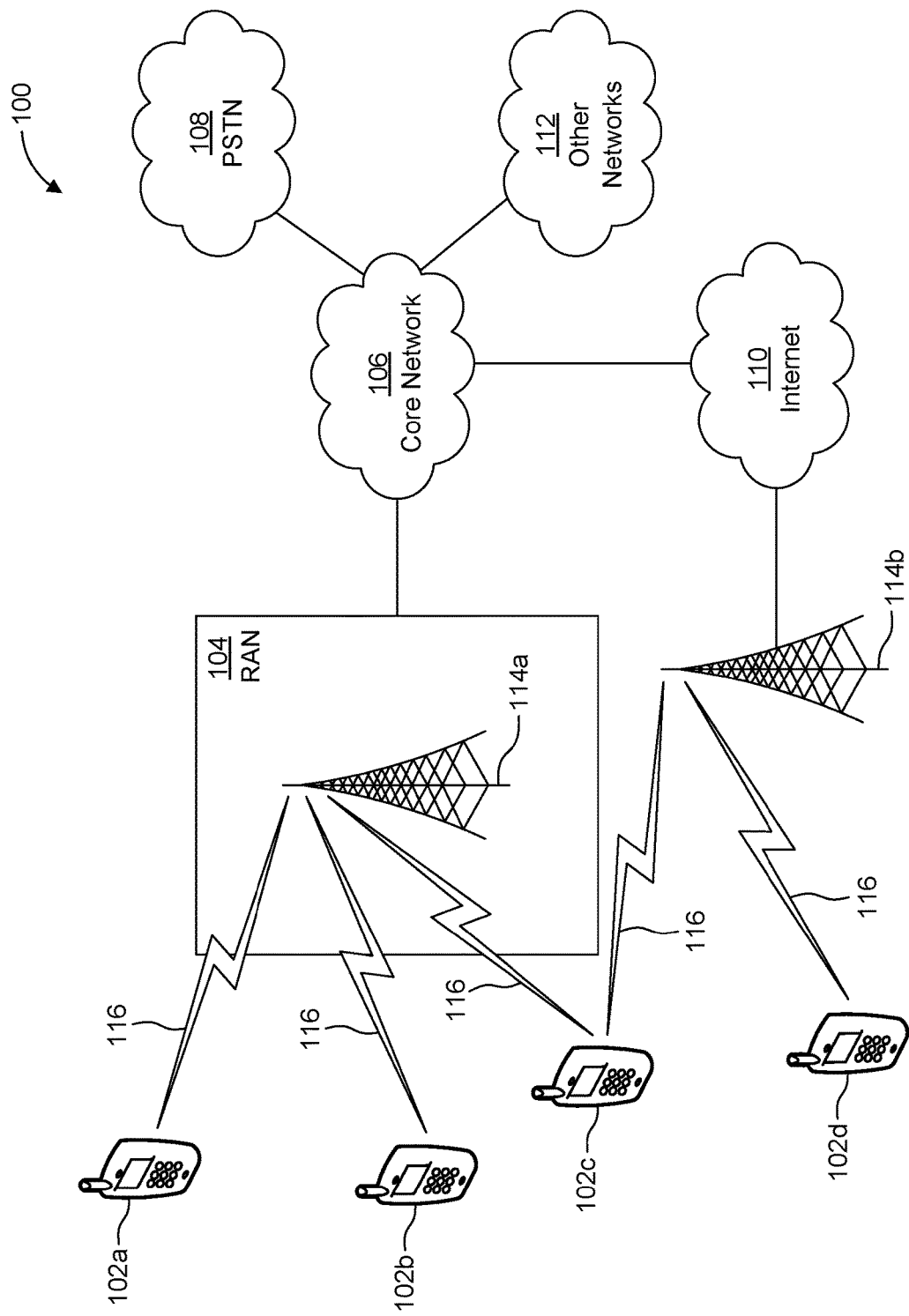
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
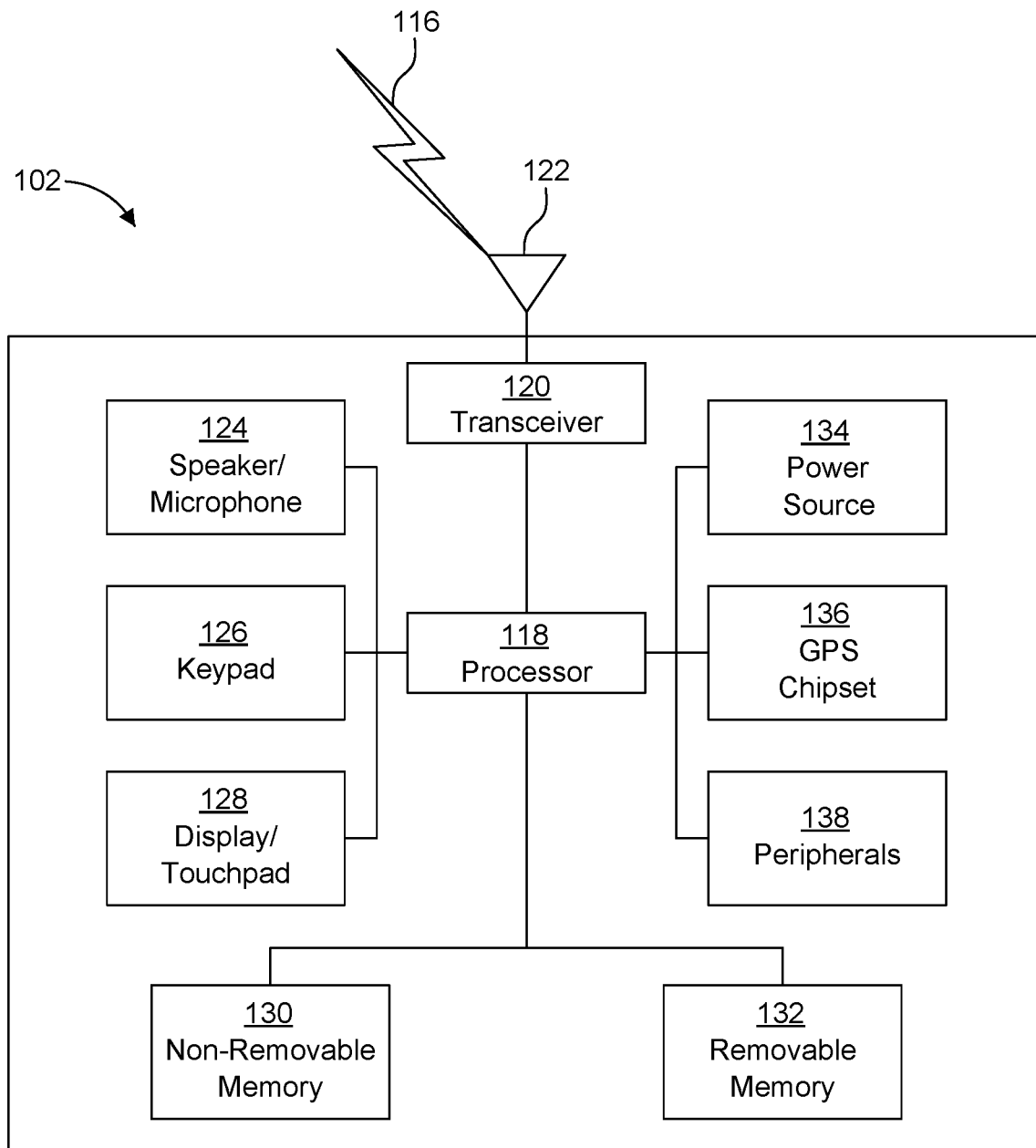
FIG. 1B is a system diagram illustrating an example wireless transmit/receive unit (WTRU) that may be used within the communications system illustrated in FIG. 1A according to an embodiment.
Figure 1C:
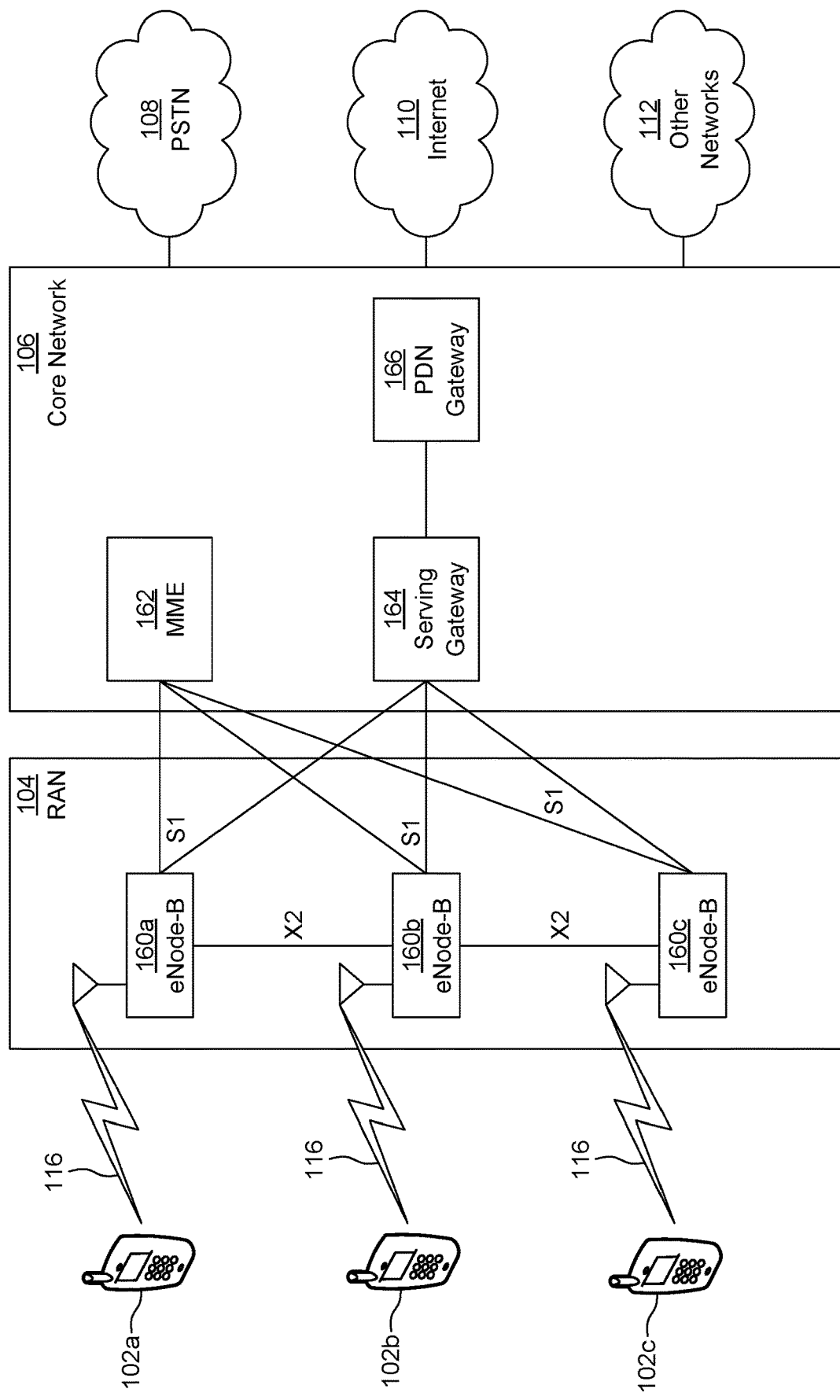
FIG. 1D is a system diagram illustrating a further example RAN and a further example CN that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
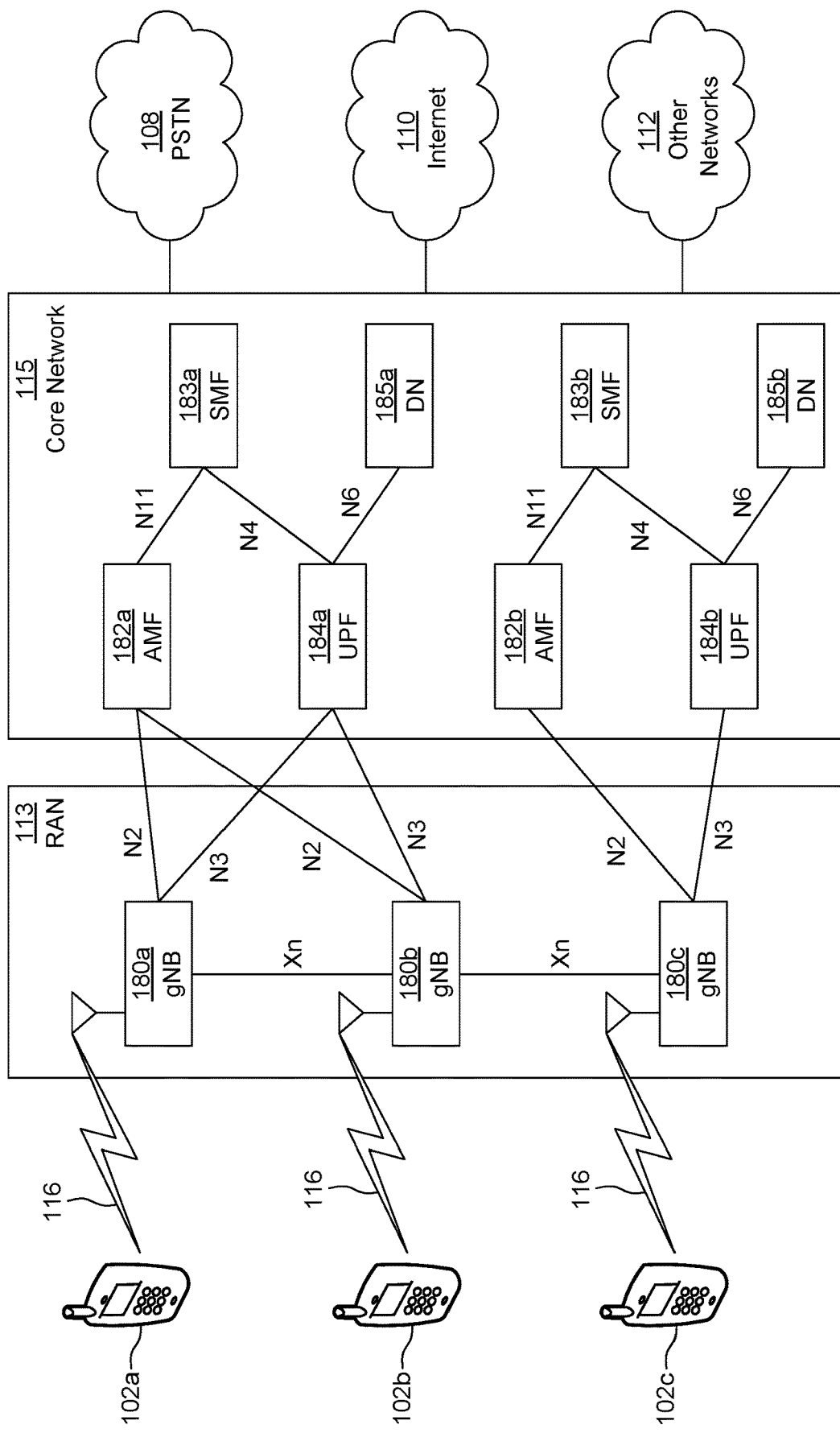

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different Network Slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

A communication network as described herein may be configured to include multiple network slices, for example, as a way to virtualize the communication network. In a virtualized communication network, WTRUs may receive differentiated services provided with virtual and/or dedicated resources. For example, a first network slice may be used to provide services for smartphones. A second network slice may be used to provide critical services such as public safety services. A third network slice may be used to provide IoT services to sensors, machines, and/or the like.

In some cases, coexistence among network slices may present issues, such as how to handle simultaneous access of a WTRU to network slices when the network slices are not allowed to be accessed and/or used simultaneously either on a PLMN basis or on a per WTRU basis, and how to prevent a WTRU from simultaneously accessing network slices that share an Access and Mobility Management Function (AMF). The AMF may host functions such as authentication and/or mobility management functions related to a network slice. A WTRU, e.g., upon registering with a network, may be allocated and/or served by an AMF (e.g., with respect to at least one network slice). The WTRU may be provided with one or more temporary identifier(s) (ID) that identifie(s) the WTRU, the AMF, and/or the association between the WTRU and the AMF.

The WTRU may transmit a registration message to the RAN. The registration message may include/indicate the NSSAI.

The RAN may be configured to direct the registration message transmitted by a WTRU to an AMF. The direction may occur, for example when a WTRU first accesses (e.g., registers with) the network, and may be based on network slice selection assistance information (NSSAI) provided by the WTRU. NSSAI may be referred to herein as and used interchangeably with assistance information and/or network slice assistance information. The AMF may authenticate and/or register the WTRU upon receiving the registration message directed by the RAN.

In an embodiment, a set of rules may give an indication as to when to enforce access exclusion of certain slices simultaneously on either PLMN basis or WTRU basis. For example, a WTRU may access slices connected to a common AMF when they have a same slice differentiator (SD) value or Slice/Service Type (SST) value. However, it may not be sufficient for the network to indicate to a WTRU what Network Slices the WTRU is allowed to access simultaneously. Rather, the WTRU may be given the possibility to indicate a preference amongst these slices, thereby enabling applications with higher relevancy or importance in the WTRU, to access Network Slices that otherwise might be prevented using a blanket approach. For example, FIG. 2 illustrates an example of network slices coexistence, where network slice exclusion rules prevent network slices from being accessed simultaneously.

Figures 2, 3, 4:
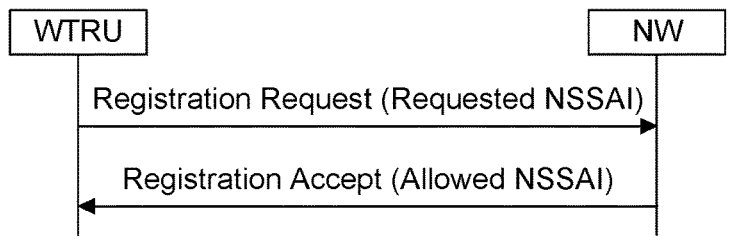
FIG. 2 illustrates an example of coexistence of network slices with different assigned priorities.
FIG. 3 illustrates groups of mutually exclusive network slices using the exclusion rule of the example of FIG. 2.
FIG. 4 illustrates an example of a registration procedure.

In the example of FIG. 2, S-NSSAI-1 may have the highest priority amongst the network slices that the WTRU may request. S-NSSAI-3 may have the second highest priority but it may not be accessed simultaneously along with S-NSSAI-1 due to exclusion rules, according for example to a first PLMN ("PLMN 1").

As illustrated in FIG. 3, services provided by mutually exclusive slices may not be delivered simultaneously. For instance, if a WTRU provides the priority indicated in FIG. 2, the network may grant 5-NSSAI-1 and S-NSSAI-2 (network slice group 1 in FIG. 3). Even though S-NSSAI-3 may have the second highest priority, it may only be accessed simultaneously with S-NSSAI-4 (network slice group 3 in FIG. 3). Since S-NSSAI-4 is the second to last priority (priority 3 in FIG. 2), such a choice may be undesirable as it would not favor the users preference.

In an embodiment, an AMF in a PLMN, for example a home PLMN or a visited PLMN, can serve any combination of S-NSSAIs that will be provided as an allowed NSSAI.

In an embodiment, practical non-roaming and roaming deployment scenarios when a 5G system is not able to support all possible combinations of S-NSSAIs for the WTRU, and the aspects of mutually exclusive access to network slices, are addressed.

There may be several use cases that address time and/or space based network slices exclusion. Generally, such use cases may show a scenario where a network operator deploys a "pocket" with network slices that are mutually exclusive within a single registration area (e.g., a campus or a factory).

For example, by internal regulation of an entity (e.g., of a subscriber, of an employer, of an operator, etc.), it might be forbidden for a WTRU to access "regular" services and "specific" services simultaneously. For example, a WTRU used by a government officer might be restricted to be either in "off-duty" (regular) or "on-duty" (specific) mode, where it may be forbidden by regulation for the WTRU to access simultaneously the off-duty services and the on-duty services.

In another example, by network capability, a factory device may have two modes of operations: "maintenance mode" (used for performing updates, e.g. blueprints upload, checking the status of the devices, monitoring and maintenance, etc.) and a "ultra-low latency factory mode", where the factory device receives Ultra-Reliable Low-Latency Communication (URLLC) commands to perform its duty. In such a case, the AMF instance used for the URLLC factory network slice may be tailored specifically to that duty, and not be able to support other services such as file database access, and the like. In that case, the device may have to select either mode and not connect to both simultaneously.

In an embodiment illustrated in FIG. 4, a WTRU may request its preferred network slice set in a "Requested NSSAI" during the registration procedure. The WTRU may indicate an absolute or relative priority amongst slices. For instance, the WTRU may request four network slices S-NSSAI-1, S-NSSAI-2, 5-NSSAI-3, S-NSSAI-4 with the priorities 1, 4, 2 and 3 respectively, e.g., as illustrated in FIG. 2.

The network may process the request during the registration procedure. If the registration procedure is successful, the network may provide the WTRU with a set of network slices that the WTRU may be permitted to use and/or an indication of which slices may be used simultaneously when sharing the same AMF. This approach may result in a removal of network slices that the WTRU could have used. As a result of the network removing them from the allowed NSSAI on the basis of being mutually exclusive, the WTRU may not be given the opportunity to selectively establish PDU sessions on these network slices. Using exclusion rules (e.g., as shown in FIG. 2), the network may allow only two of the four requested slices, for instance S-NSSAI-2 and S-NSSAI-4.

In an embodiment, a WTRU may choose the network slices that are mutually exclusive during the establishment of a PDU session as opposed to taking this decision during the registration procedure.

In an embodiment, a WTRU may request network slices for some or all services it supports. The WTRY may request access to these network slices after it has successfully registered to the network.

In an embodiment, there may be a determination of a WTRU preference as to which network slices to be requested based on PDU sessions to be established or re-activated.

In an embodiment, the WTRU may select network slices to be used after system registration. This selection may be based on the allowed NSSAI which may contain mutually and/or non-mutually exclusive network slices and a set of exclusion rules.

In an embodiment, the WTRU may use network slices based on exclusion rules that no longer apply (e.g., the case where the WTRU has crossed over a new Tracking Area (TA) or a time of the day that enables access to network slices that were not otherwise allowed to be accessed simultaneously).

In an embodiment, it may be possible to request a release of a PDU session to enable the establishment of a new PDU session on mutually exclusive network slices.

The embodiments discussed herein may be implemented individually or in any combination with each other, and the way in which they are disclosed is not meant to limit the manner in which they may be applied to one or more issues arising from scenarios discussed herein.

The determination of network slices that are mutually exclusive may be an operator decision. This may be done on a per WTRU basis (i.e., per subscription) or on a per PLMN basis. Regardless of the scope of exclusion amongst network slices, the network may inform the WTRU which slices are mutually exclusive. The network may communicate network slice exclusion to the WTRU using various mechanisms. The WTRU may use the exclusion rules in various ways when requesting the establishment of PDU sessions.

In an embodiment, the fact that two or more network slices are mutually exclusive may not automatically imply that these network slices are not allowed in the PLMN. For example, if the mutually exclusive network slices were to be accessed at different times, the WTRU may be allowed to do so.

In an embodiment, the allowed NSSAI provided to the WTRU during a registration procedure may only include network slices that can be simultaneously accessed. In such a case, the network slices that a WTRU is normally allowed to access might not be included in the allowed NSSAI, since they cannot be accessed simultaneously when other network slices are also accessed. Such an approach may limit the possibilities for a WTRU to access slices for services required by certain applications even when network slices in the allowed NSSAI are not being used.

A network may indicate to a WTRU (e.g., configure the WTRU with) a list of allowed NSSAIs. The network may provide the indication (e.g., configuration) in an NAS message sent to the WTRU (e.g., such as an attached accept message). The network may indicate in the NAS message which network slice(s) may have connection(s) that have already been set up for the WTRU. In an embodiment, the WTRU may be provided with the full set of allowed NSSAI and the information on whether two or more S-NSSAI contained in the allowed NSSAI are mutually exclusive may be provided in addition to the allowed NSSAI. The network may indicate to the WTRU under what conditions network slices are mutually exclusive. For example, network slices might be mutually exclusive within a set of tracking areas (i.e., within a same Registration Area and within the PLMN), but they might be used simultaneously outside this set of tracking areas. The network might provide the WTRU with information as to whether network slices are always mutually exclusive, as to whether network slices are mutually exclusive within one or more specific time intervals, etc.

Figure 5:
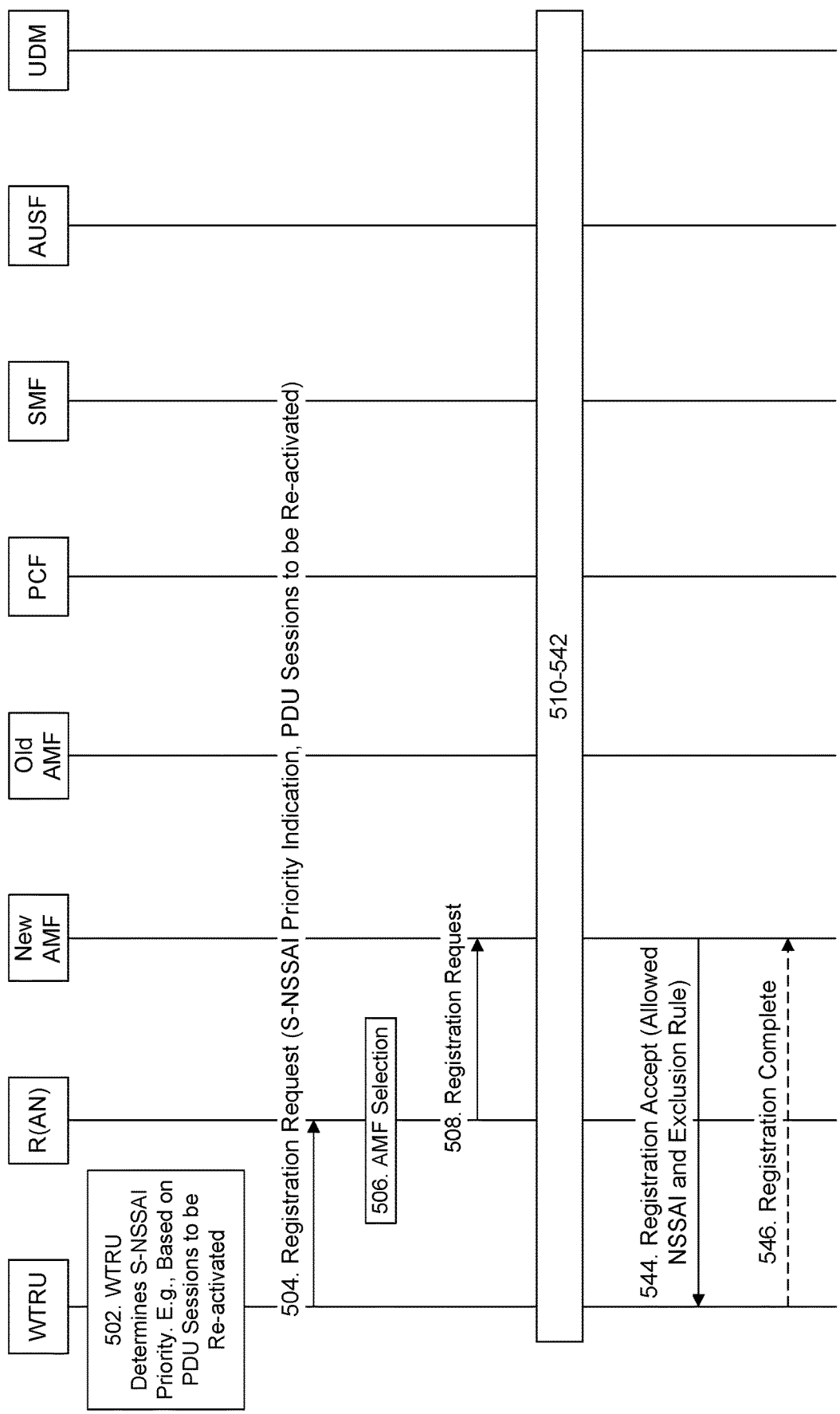
FIG. 5 illustrates an example of an updated registration procedure.

FIG. 5 illustrates an example of a registration procedure 500 according to an embodiment. During the registration procedure, the WTRU may provide to the network, for example to the AMF, an indication on its preference as to which network slices should be accessed at any time. The WTRU may use pre-configured information, network provided information (e.g., through the WTRU Configuration Update command), and/or other available information. For example, the WTRU may derive this preference based on a PDU session to be established or re-activated. The WTRU may use the information of the PDU session to be established to prioritize the selection of network slices for PDU sessions already established.

The registration procedure 500 may be carried out as follows:

The WTRU may determine network S-NSSAI priority (502). The priority may be determined based on PDU sessions to be reactivated, for example.

The WTRU may send a registration request message to the RAN (504). In an embodiment registration request message may include and/or indicate S-NSSAI priority and/or PDU sessions to be re-activated.

The RAN may select an AMF (506).

The RAN may send a registration request to the selected AMF (new AMF) (508).

The new AMF may send a Namf_Communication_UE-ContextTransfer message to the old AMF (510).

The old AMF may send a Namf_Communication_UE-ContextTransfer response to the new AMF (512).

The new AMF may send an Identify Request message to the WTRU (514).

The WTRU may send an Identify Response message to the new AMF (516).

The new AMF may select an Authentication Server Function (AUSF) (518).

The AUSF may perform an authentication/security process (520).

The new AMF may send a Namf_Communication_RegistrationCompleteNotify message to the old AMF (522).

The new AMF and the WTRU may exchange Identify Request/Response messages (524).

The new AMF may send a N5g-eir EquipmentIdentity-Check_Get to an Equipment Identity Register (EIR) and may receive a response (526).

The new AMF may select a Unified Data Management Function (UDM) (528).

A Nudm_UECM_Registration procedure may be performed (530a).

A Nudm_SDM_Get procedure may be performed (530b).

The new AMF may send a "Nudm_SDM_Subscribe" message to the UDM (530c).

The UDM may send a Nudm_UECM_DeregistrationNotify to the old AMF (530d).

The old AMF may send a Nudm_SDM_Unsubscribe message to the UDM (530e).

The new AMF may select a Policy Control Function (PCF) (530f).

An AM policy association establishment may be performed (532)

The new AMF may send a Namf_Event_Exposure_Subscribe message to the PCF (534).

The PCF may send a Nsmf_PDUSession_UpdateSMContext/Nsmf_PDUSession_ReleaseSMContext message to a Session Management Function (SMF) (536).

The new AMF may send an N2 AMF Mobility Request message to an interworking function (N3IWF) (538).

The N2IWF may sends an N2 AMF Mobility Response message to the new AMF (540).

An N2 AMF Mobility Response procedure may be performed between the old AMF and the PCF (542).

The new AMF may send a Registration Accept message containing the allowed NSSAI to the WTRU (544). This step may be updated in an embodiment by indicating one or more network slices exclusion rules. The network may derive the set of network slices that can and cannot be accessed simultaneously. The network may use both the preference provided by the WTRU during the registration request and the PDU sessions-to-be-reactivated to derive the exclusion rules. The exclusion rules may indicate the conditions under which the WTRU can simultaneously access network slices (e.g., time of the day or a specific tracking area). Further, similar to the derivation and construction of the allowed NSSAI which may be provided upon successful registration, a new set of exclusion rules may also be provided upon a successful registration procedure.

The WTRU may send a Registration Complete message to the new AMF (546).

In an embodiment, the WRTU may request the establishment of PDU sessions on network slices that cannot be accessed simultaneously. This may cause the release of an existing PDU session on currently accessed network slices. The allowed NSSAI may be able to contain network slices that can be accessed simultaneously as long as the network is able to provide exclusion rules to the WTRU that clearly indicate what network slices may be accessed simultaneously and under what conditions. The WTRU may use the allowed NSSAI along with the exclusion rules provided via the Registration Accept message (step 544 of FIG. 5) to determine which network slices may be used when requesting the establishment of a PDU session.

The WTRU may request PDU sessions to be established on mutually exclusive network slices if the exclusion rule that prevented the network slices to be accessed no longer applies. For example, the WTRU may cross a Tracking Area boundary within the same Registration Area, or the time of the day may allow access to mutually exclusive network slices that were not otherwise allowed. Additionally, during a PDU session establishment request, the WTRU may indicate whether a different PDU session needs to be released to allow the selection of a network slice that cannot be accessed simultaneously with network slices supporting this different PDU session.

Figure 6:
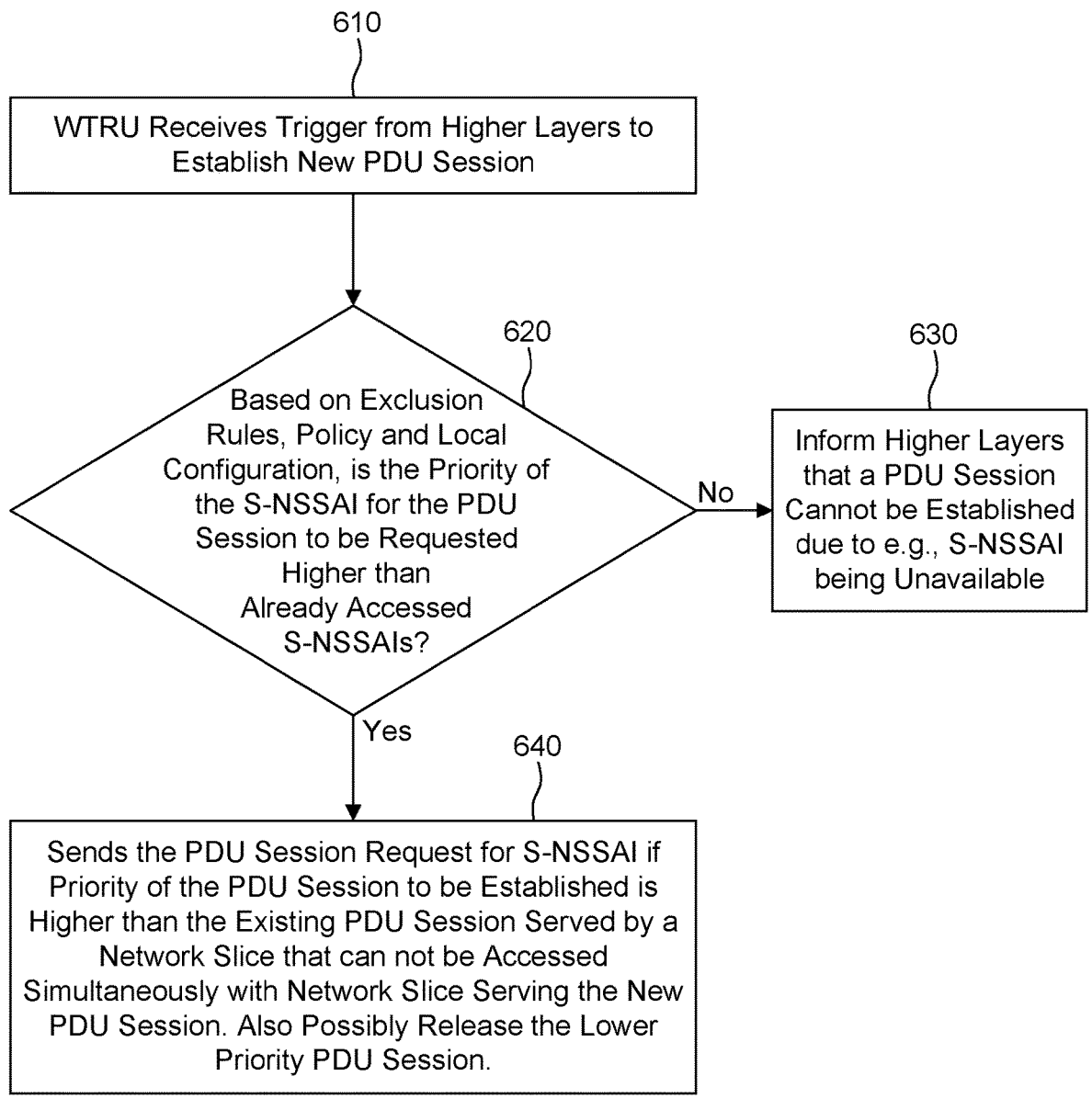
FIG. 6 illustrates an example of establishment of a PDU session.

FIG. 6 is a flowchart illustrating an example of use of exclusion rules along with local configuration/network configuration. These rules may address, for example, the establishment of PDU sessions that are waiting to be activated. The reactivation of PDU sessions triggered as a result of a Service Request, may undergo similar treatment as that described for the PDU Session Establishment procedure. A Service Request procedure may also trigger the release of PDU sessions on slices with lower priority.

At 610, the WTRU may receive a trigger from higher layers to establish a new PDU session. At 620, based on one or more exclusion rules and/or on a policy and/or on a local configuration, the WTRU may check if the priority of the S-NSSAI for the PDU session to be requested is higher than already accessed S-NSSAIs. If not, the WTRU may inform, at 630, higher layers that a PDU session cannot be established due to, for example, an S-NSSAI being unavailable. If yes, the WTRU may send a PDU session request for S-NSSAI if the priority of the PDU session to be established is higher than the existing PDU session served by a network slice that cannot be accessed simultaneously with the network slice serving the new PDU session. The WTRU may also release the lower priority PDU session.

Figure 7:
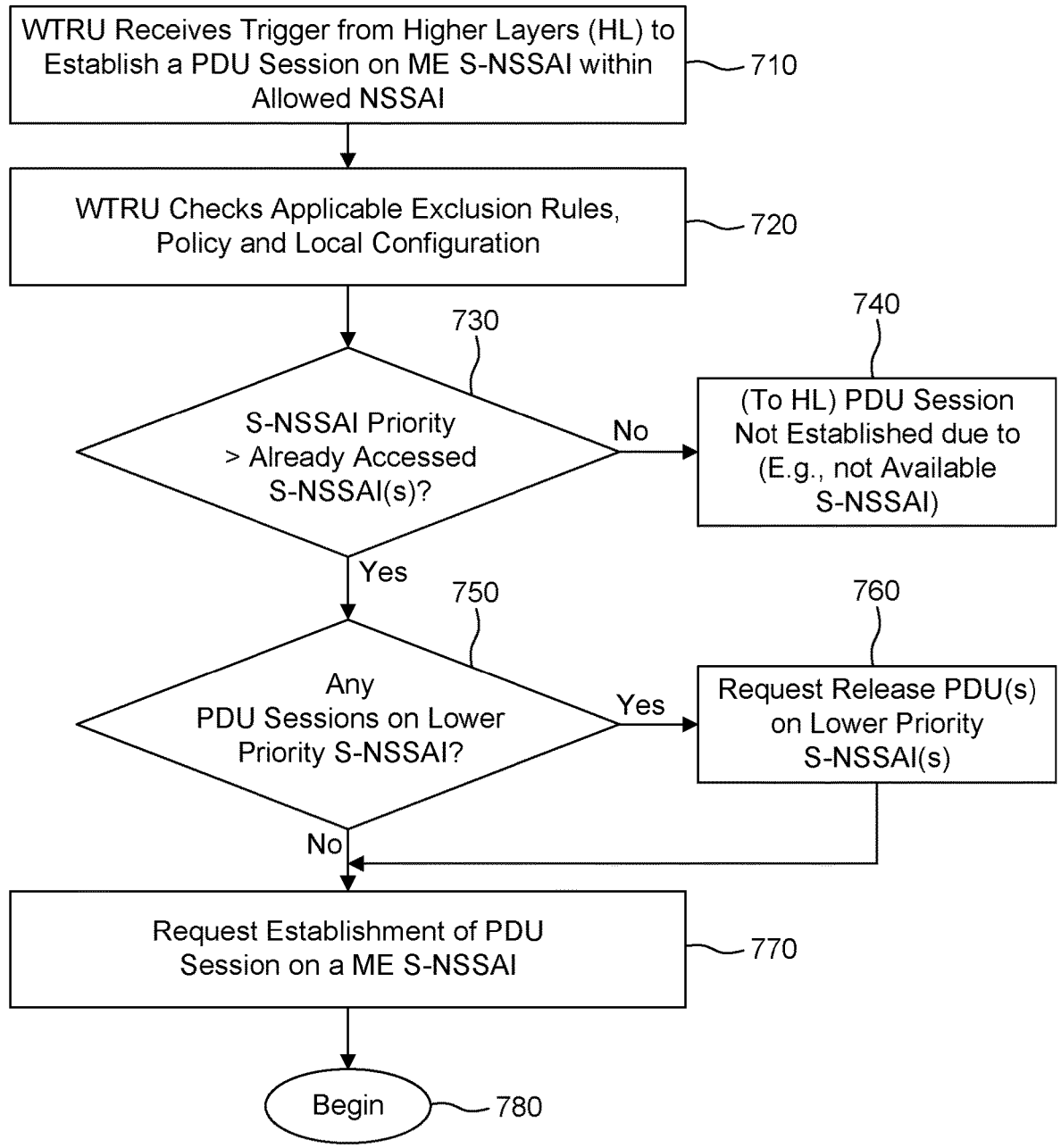
FIG. 7 illustrates another example of establishment of a PDU session.

FIG. 7 is a flowchart illustrating a further example of use of exclusion rules along with local configuration/network configuration.

At 710, the WTRU may receive a trigger from higher layers to establish a PDU session on a mutually exclusive network slice (ME S-NSSAI) within an allowed NSSAI. At 720, the WTRU may check applicable exclusion rules, policy and local configuration. At 730, the WTRU may check if the priority of the S-NSSAI for the PDU session to be requested is higher than already accessed S-NSSAIs. If not, the WTRU may inform, at 740, higher layers that a PDU session cannot be established due to, for example, an S-NSSAI being unavailable. If yes, the WTRU may check, at 750, if there are any PDU sessions on lower priority 5-NSSAI(s). If there are such PDU sessions, the WTRU may request, at 760, the release of PDJ sessions on lower priority S-NSSAI(s). At 770, the WTRU may request the establishment of a PDU session on the mutually exclusive network slice. The PDU session may begin at step 780.

Figure 8:
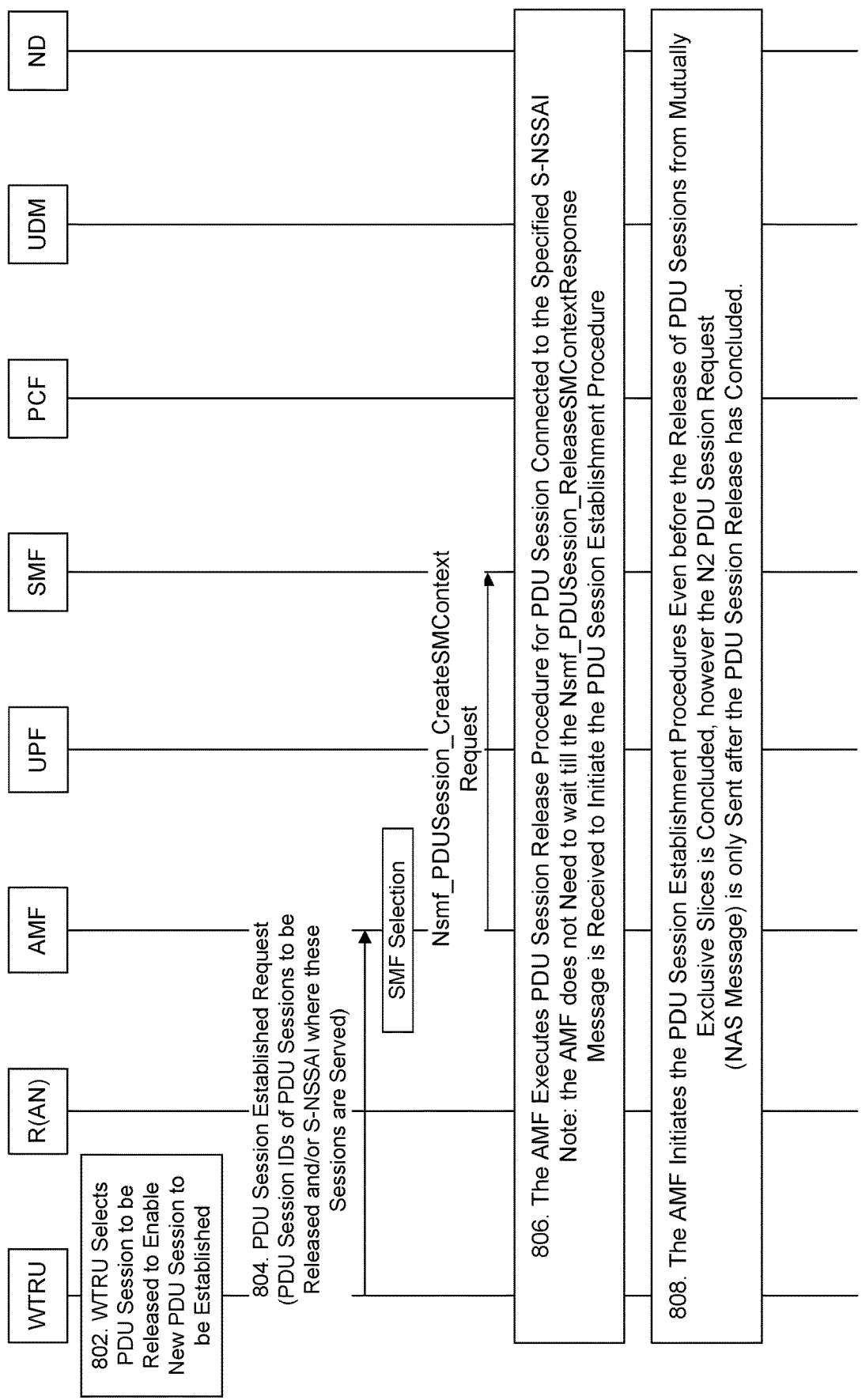
FIG. 8 illustrates an example of PDU establishment with simultaneous PDU session release.

FIG. 8 illustrates an example of PDU establishment with simultaneous PDU session Release. The WTRU may select S-NSSAIs to request the establishment of a PDU session based on the Allowed NSSAI, the network slice selection rules, and the local configuration (802). The WTRU may make the selection, for example, in accordance with any of the procedure 600 (FIG. 6) and the procedure 700 (FIG. 7). In an embodiment, the selection may occur when the WTRU has PDU sessions served on network slices that are mutually exclusive with regard to the S-NSSAI upon which the WTRU is requesting to establish the PDU session. The WTRU may initiate the release of one or more PDU sessions that cannot co-exist with the new PDU session (based on the received S-NSSAI priority and the exclusion rules) before initiating the PDU session establishment procedure. A new cause value may be included in the PDU session release message to inform the AMF or SMF that the PDU session is being released for slice coexistence purposes.

The WTRU may initiate a PDU Session Establishment procedure, providing the S-NSSAIs for a PDU session to be established (804). The WTRU may include the S-NSSAIs that cannot be accessed simultaneously with existing S-NSSAIs that were already serving established PDU sessions. This information may act as an indication to the network that the existing PDU session may need to be released to allow the establishment of the new PDU sessions on S-NSSAIs that are mutually exclusive with the existing S-NSSAIs.

When the AMF receives the S-NSSAI along with the new request to establish additional PDU sessions, the AMF may initiate the release of the PDU session for the affected S-NSSAI (806). The AMF may be aware of the slice coexistence rules, therefore when the AMF receives the S-NSSAI corresponding to a new PDU session in the PDU session establishment message, the AMF may trigger the release of one or more PDU sessions which cannot coexist with the S-NSSAI received in the mobility management part of the PDU Session Request message.

Although the AMF may execute both procedures simultaneously, the AMF may need to ensure that a PDU session on mutually exclusive network slices is fully released before the new PDU session can be established (808).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (e.g., but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. Further, it is to be understood that the headings used herein are used to aid in understanding of the various disclosed embodiments and are not intended to be limiting.

As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any UE recited herein, are provided below with respect to FIGS. 1A-1D.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WRTU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM")) or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method, implemented in a wireless transmit/receive unit (WTRU), for managing network slices through deactivation and activation of protocol data unit (PDU) sessions, the method comprising:
registering with a network;
determining, based on one or more rules on use of network slices, one or more conditions on exclusivity of a first network slice with respect to one or more second network slices associated to one or more PDU sessions, wherein a first priority is associated with the first network slice, and wherein one or more second priorities are associated with the one or more of the second network slices, respectively; and
while remaining registered to the network, and based on (i) the one or more conditions on exclusivity indicating that simultaneous use of the first network slice and one or more of the one or more second network slices is prohibited and (ii) the first priority being higher than the one or more second priorities,
deactivating the one or more PDU sessions associated with the one or more of the one or more second network slices, wherein at least one PDU session of the one or more PDU sessions remains established after being deactivated; and
activating a PDU session via the first network slice.

2. The method of claim 1, further comprising receiving, from the network, a transmission including any of information for configuring the one or more rules and a plurality of network slice selection assistance information (NSSAIs), including at least a first NSSAI and one or more S cond NSSAIs.

3. The method of claim 1, wherein activating the PDU session via the first network slice while remaining registered to the network comprises any of establishing the PDU session via the first network slice and reactivating a deactivated PDU session associated with the first network slice.

4. The method of claim 1, further comprising:
performing re-registration with the network based on (i) the one or more conditions on exclusivity indicating any use of the first network slice with the one or more of the one or more second network slices is prohibited and (ii) the first priority being higher than the one or more second priorities.

5. The method of claim 4, the method comprising:
establishing a PDU session via the first network slice after re-registering with the network.

6. The method of claim 1, wherein the one or more rules refer to network slices using corresponding network slice selection assistance informations (NSSAIs), and wherein determining the one or more conditions on exclusivity comprises evaluating the or more rules using a first NSSAI.

7. The method of claim 1, wherein a third priority is associated with data for transmission on the first network slice, wherein each of one or more fourth priorities is associated with data for transmission on a respective one of the one or more of the one or more second network slices, and wherein the first priority being higher than the one or more second priorities comprises the third priority being higher than the one or more fourth priorities.

8. The method of claim 1, wherein a third priority is associated with data for transmission on the first network slice, wherein each of one or more fourth priorities is associated with data for transmission on a respective one of the one or more of the one or more second network slices, and wherein the first priority being higher than the one or more second priorities comprises the third priority being higher than the one or more fourth priorities for a time period, and the method comprising deactivating the PDU session at or before the time period expires.

9. The method of claim 1, wherein the one or more conditions on exclusivity indicate that simultaneous use of the first network slice and at least one of the one or more second network slices is permitted.

10. The method of claim 1, wherein the first priority being higher than the one or more second priorities is based on data for transmission on the first network slice being prioritized over data for transmission on the one or more of the one.or more second network slices.

11. The method of claim 1, further comprising:
determining that a first network slice selection assistance information (NSSAI) corresponding to a first network slice is not among one or more NSSAIs corresponding to the one or more second network slices associated to the one or more PDU sessions.

12. The method of claim 1, further comprising:
while remaining registered to the network, and based on (i) the one or more conditions on exclusivity indicating that simultaneous use of the first network slice and the one or more of the one or more second network slices is prohibited and (ii) the first priority being higher than the one or more second priorities,
after deactivation of the PDU session associated with the first network slice, reactivating one or more of the one or more PDU sessions associated with the one or more of the one or more second network slices.

13. A wireless transmit/receive unit (WTRU) comprising circuitry, including any of a transmitter, receiver, processor and memory, configured to:
register with a network;
determine, based on one or more rules on use of network slices, one or more conditions on exclusivity of a first network slice with respect to one or more second network slices associated to one or more PDU sessions, wherein a first priority is associated with the first network slice, and wherein one or more second priorities are associated with the one or more of the second network slices, respectively; and
based on (i) the one or more conditions on exclusivity indicating that simultaneous use of the first network slice and one or more of the one or more second network slices is prohibited and (ii) the first priority being higher than the one or more second priorities, and while remaining registered to the network,
deactivate the one or more PDU sessions associated with the one or more of the one or more second network slices, wherein at least one PDU session of the one or more PDU sessions remains established after being deactivated; and
activate a PDU session via the first network slice.

14. The WTRU of claim 13, wherein the circuitry is configured to receive, from the network, a transmission including any of information for configuring the one or more rules and a plurality of network S as sistance informations (NSSAIs), and wherein the plurality of NSSAIs comprise at least a first NSSAI and one or more second NSSAIs.

15. The WTRU of claim 13, wherein the circuitry is configured to activate the PDU session via the first network slice while remaining registered to the network by any of establishing the PDU session via the first network slice and reactivating a deactivated PDU session associated with the first network slice.

16. The WTRU of claim 13, wherein the circuitry is configured to:
perform re-registration with the network based on (i) the one or more conditions on exclusivity indicating any use of the first network slice with the one or more of the one or more second network slices is prohibited and (ii) the first priority being higher than the one or more second priorities.

17. The WTRU of claim 16, wherein the circuitry is configured to:
establish a PDU session via the first network slice after re-registering with the network.

18. The WTRU of claim 13, wherein the one or more rules refer to network slices using corresponding netw informations (NSSAIs), and wherein the circuitry is configured to determine the one or more conditions on exclusivity at least in part by evaluating the one or more rules using a first NSSAI.

19. The WTRU of claim 13, wherein a third priority is associated with data for transmission on the first network slice, wherein each of one or more fourth priorities is associated with data for transmission on a respective one of the one or more of the one or more second network slices, and wherein the third priority being higher than the one or more fourth priorities.

20. The WTRU of claim 13, wherein a third priority is associated with data for transmission on the first network slice, wherein each of one or more fourth priorities is associated with data for transmission on a respective one of the one or more of the one or more second network slices, and wherein the first priority being higher than the one or more second priorities comprises the third priority being higher than the one or more fourth priorities for a time period, and wherein the circuitry is configured to deactivate the PDU session at or before the time period expires.

21. The WTRU of claim 13, wherein the one or more conditions on exclusivity indicate that simultaneous use of the first network slice and at least one of the one or more second network slices is permitted.

22. The WTRU of claim 13, wherein the first priority being higher than the one or more second priorities is based on data for transmission on the first network slice being prioritized over data for transmission on the one or more of the e or more second network slices.

23. The WTRU of claim 13, wherein the circuitry is configured to:
determine that a first network slice selection assistance information (NSSAI) corresponding to the first network slice is not among one or more NSSAIs corresponding to the one or more second network slices associated to the one or more PDU sessions.

24. The WTRU of claim 13, wherein the circuitry is configured to:
while remaining registered to the network, and based on (i) the one or more conditions on exclusivity indicating that simultaneous use of the first network slice and the one or more of the one or more second network slices is prohibited and (ii) the first priority being higher than the one or more second priorities,
after deactivation of the PDU session associated with the first network slice, reactivate one or more of the one or more PDU sessions associated with the one or more of the one or more second network slices.

\* \* \* \* \*